(12) United States Patent
Ootomo et al.

(10) Patent No.: US 6,320,152 B1
(45) Date of Patent: Nov. 20, 2001

(54) WIRE ELECTRICAL DISCHARGE MACHINE

(75) Inventors: Youichi Ootomo; Toshio Moro, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,846

(22) Filed: May 25, 2000

Related U.S. Application Data

(63) Continuation of application No. PCT/JP97/04294, filed on Nov. 25, 1997.

(51) Int. Cl.$^7$ .................................................. B23H 7/10
(52) U.S. Cl. .................................................. 219/69.12
(58) Field of Search ........................... 219/69.12, 137.2, 219/137.7; 226/190, 194, 189

(56) References Cited

U.S. PATENT DOCUMENTS

| | | | |
|---|---|---|---|
| 4,027,815 | * | 6/1977 | Young ................................. 226/194 |
| 4,866,970 | * | 9/1989 | Castiglioni ......................... 226/190 |
| 5,073,691 | * | 12/1991 | Magara et al. .................... 219/69.12 |
| 5,495,086 | * | 2/1996 | Onandia ............................. 219/69.12 |

FOREIGN PATENT DOCUMENTS

| | | | |
|---|---|---|---|
| 59-14428 | | 1/1984 | (JP) . |
| 63-312025 | | 12/1988 | (JP) . |
| 64-20929 | | 1/1989 | (JP) . |
| 1-150676 | | 6/1989 | (JP) . |
| 7-276146 | | 10/1995 | (JP) . |
| 1-92029 | * | 4/1989 | (JP) ................................. 219/69.12 |

OTHER PUBLICATIONS

International Search Report

* cited by examiner

*Primary Examiner*—Geoffrey S. Evans
(74) *Attorney, Agent, or Firm*—Sughrue, Mion, Zinn, Macpeak & Seas, PLLC

(57) ABSTRACT

A wire electrical discharge machine includes a wire electrode for causing electrical discharge to take place between the same and a workpiece; a first roller and a second roller for taking up the wire electrode while nipping the same; a perpendicularly moving mechanism for moving the second roller in a perpendicular direction with respect to the first roller; and a liquid supplying mechanism for guiding the wire electrode into a gap between the first roller and the second roller by a liquid.

4 Claims, 5 Drawing Sheets

WIRE ELECTRICAL DISCHARGE MACHINE

This is a Continuation of PCT application No. PCT/JP97/04294 filed Nov. 25, 1997.

BACKGROUND OF THE INVENTION

1. Field of the Invention

The present invention relates to improvements in a wire electrical discharge machine, and more particularly to a mechanism for feeding and collecting a wire electrode.

2. Description of the Related Art

A conventional wire electrical discharge machine disclosed in Japanese Patent Unexamined Publication No. Hei. 7-276146 will be described with reference to FIGS. 4 to 6. In FIGS. 4 to 6, the wire electrical discharge machine is a machine tool wherein a phenomenon of electric discharge is caused to take place between a wire electrode land a workpiece 2 to perform cutting-out processing with respect to the workpiece 2 such as a superalloy. When discharge machining is started, the wire electrode 1 must be inserted in advance in a start hole formed in the workpiece 2, and the wire electrode 1 must always be fed during wire electrical discharge machining.

In terms of its main elements, the wire electrical discharge machine is comprised of a mechanism for feeding the wire electrode 1 and a mechanism for collecting it; a driving section for rotating a capstan roller 32 of this mechanism; a pressing section for imparting a pressing force to a pinch roller 52; and a processing tank 9 placed on a surface plate 4 to keep the workpiece 2 immersed in a working fluid 7.

The mechanism for feeding the wire electrode 1 is adapted to feed the wire electrode 1, which is wound around a feed bobbin 10, by means of a pulley 11 and a lower roller 12, and is arranged such that the fluid flowing out from a pump 13 serving as a liquid supplying means, together with the wire electrode 1, is passed through a pipe 14 incorporated in a lower arm 6, and is fed into a gap between the capstan roller 32 and the pinch roller 52.

The mechanism for collecting the wire electrode 1 is arranged such that the wire electrode 1 fed from the lower roller 12 is passed through the pipe 14, and while the wire electrode 1 is being nipped by a nipping section formed by the capstan roller 32 and the pinch roller 52, the two rollers 32 and 52 rotate to take up the wire electrode 1 and accommodate it in a collection box 60.

As shown in FIG. 5, the driving section for the capstan roller 32 is arranged such that a shaft of a drive motor 20 is coupled to one end of a shaft 24 by means of a coupling 22, the other end of the shaft 24 is fixed to the capstan roller 32 by a bolt 36, and the shaft 24 is supported by bearings 28 and 29 engaged and fixed in a groove portion of a housing 30, and is engaged in a seal 26 provided on the outer end of the groove portion of the housing 30.

A pressing portion for the pinch roller 52 is rotatably supported by a shaft 47 by means of a pair of bearings 58 incorporated in the pinch roller 52, and a lever 21 is fixed to a periphery of the shaft 47 and has one end supported rotatably and the other end fixed to a distal end of a spring 58 so as to impart a pressing force to the pinch roller 52 and nip the wire electrode 1 at its surface of contact with the capstan roller 32. It should be noted that the other end of the spring 58 is fixed to a projecting portion 61 formed on an unillustrated casing.

A first gear 34 and a second gear 54 are respectively fixed to the capstan roller 32 and the pinch rollers 52. Here, the reason for disposing the gears 34 and 54 in the vicinities of the two rollers 32 and 52 is that the maintenance is facilitated.

Referring to FIGS. 4 to 6, a description will be given of the operation of the wire electrical discharge machine constructed as described above. After the wire electrode 1 is inserted in advance in the start hole formed in the workpiece 2, and the lever 21 is raised by an unillustrated cylinder, the wire electrode 1, together with the liquid flowing out from the pump 13 through the lower roller 12, is passed through the pipe 14, and a liquid column in which the wire electrode 1 is entrained is pressed and inserted into the gap between the two rollers 32 and 52. By means of this insertion, the pinch roller 32 undergoes rotating operation by the lever 21 so as to enlarge the gap between the two rollers 32 and 52 and allow the wire electrode 1 to be inserted therethrough. Incidentally, after this insertion is finished, the supply of the liquid is stopped.

Next, while the phenomenon of electric discharge is caused to take place, between the wire electrode 1 and the workpiece 2, the workpiece 2 is subjected to cutting-out processing, and the drive motor 20 is rotated, which in turn causes the first gear 34 fixed to the shaft 24 to rotate and the second gear 54 to rotate simultaneously. Consequently, the capstan roller 32 and the pinch roller 52 rotate while nipping the wire electrode 1, the wire electrode 1 is fed from the wire bobbin 10 through the pulley 11, and the used wire electrode 1 is accommodated in the collection box 60.

However, curling of the wire electrode 1 can sometimes occur, so that there has been a problem in that the wire electrode 1 becomes entangled with the first gear 34 and/or the second gear 54, or the wire electrode 1 in the collection box 60 assumes a bulky state.

The reason for this is that, in the first place, since the pinch roller 52 is rotated about the fulcrum of rotation of the lever 21, the pinch roller 52 is moved perpendicularly to the capstan roller 32, so that the pinch roller 52 is deformed as shown in FIG. 7 due to the pressing force applied between the two rollers 32 and 52.

Secondly, since the seal 26 is present between the bearing 29 and the capstan roller 32, a large distance is produced between the bearing 29 and the pinch roller 52, and due to the external force applied to the pinch roller 52 flexural distortion is produced and skew occurs in the contact surfaces of the two rollers 32 and 52.

SUMMARY OF THE INVENTION

The present invention has been made to overcome the above-described problems, and its object is to provide a wire electrical discharge machine in which the curl in the wire electrode is difficult to occur, and trouble is unlikely to occur even if the curl occurs.

To attain this object, according to the invention, there is provided a wire electrical discharge machine comprising: a wire electrode for causing electrical discharge to take place between the same and a workpiece; a first roller and a second roller for feeding the wire electrode while nipping the same; perpendicularly moving means for moving the second roller in a perpendicular direction with respect to the first roller; and liquid supplying means for guiding the wire electrode into a gap between the first roller and the second roller by means of a liquid.

DETAILED DESCRIPTION OF THE PREFERRED EMBODIMENTS

Next, a description will be given hereafter of an embodiment of the present invention.

First Embodiment

Figure 1:
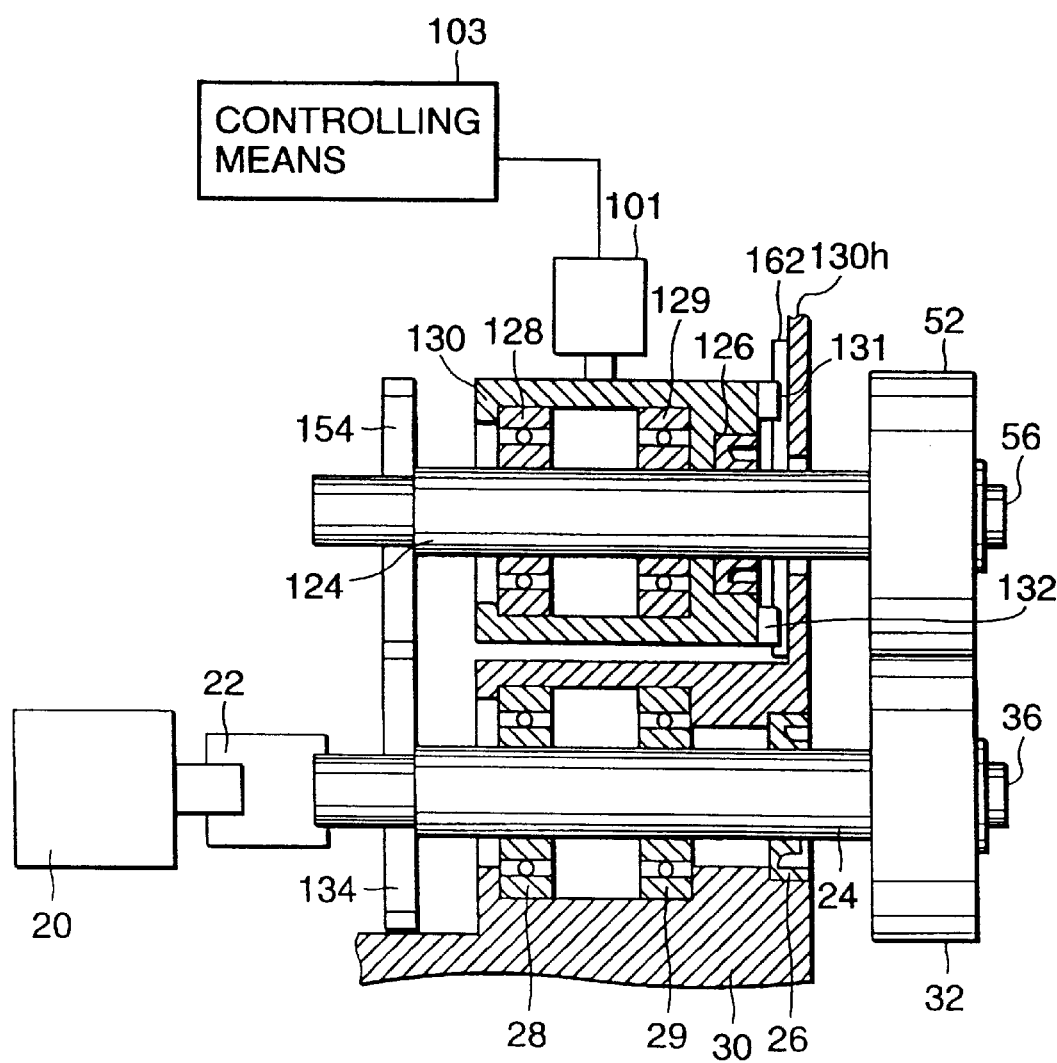
FIG. 1 is a cross-sectional view of a roller driving mechanism according to an embodiment of the invention.
Figure 4:
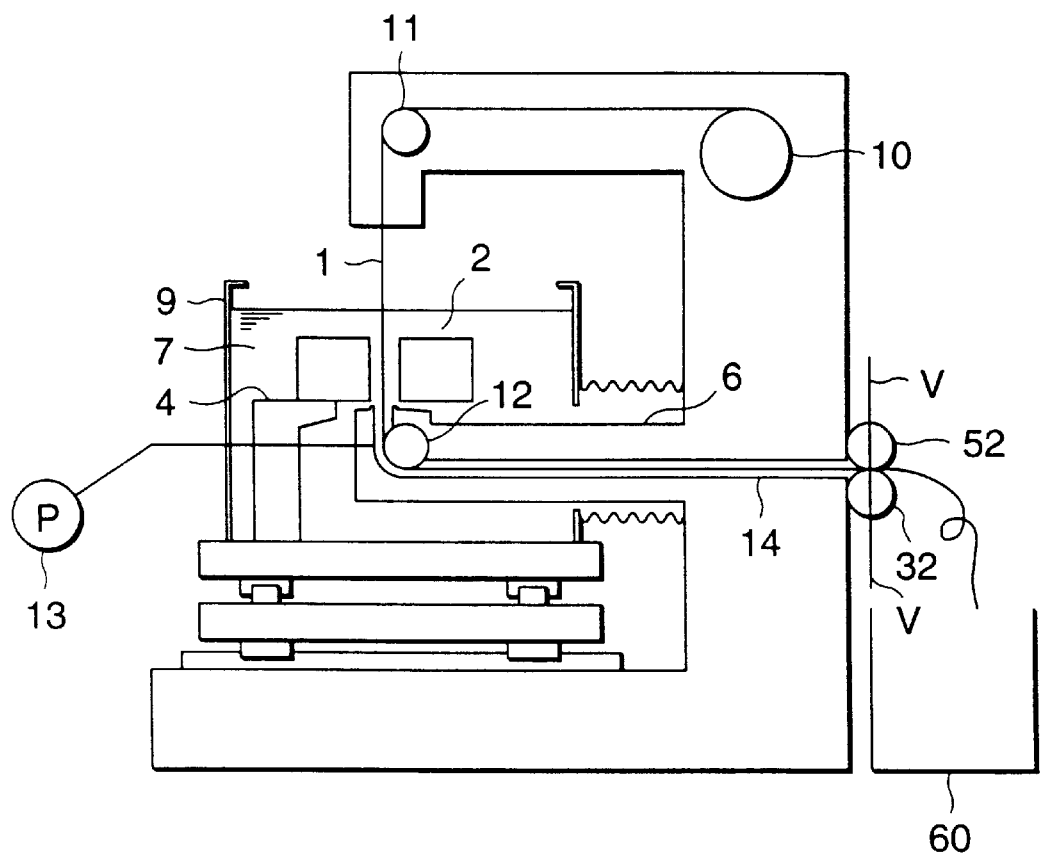
FIG. 4 is a schematic view of a wire electrical discharge machine.
Figure 5:
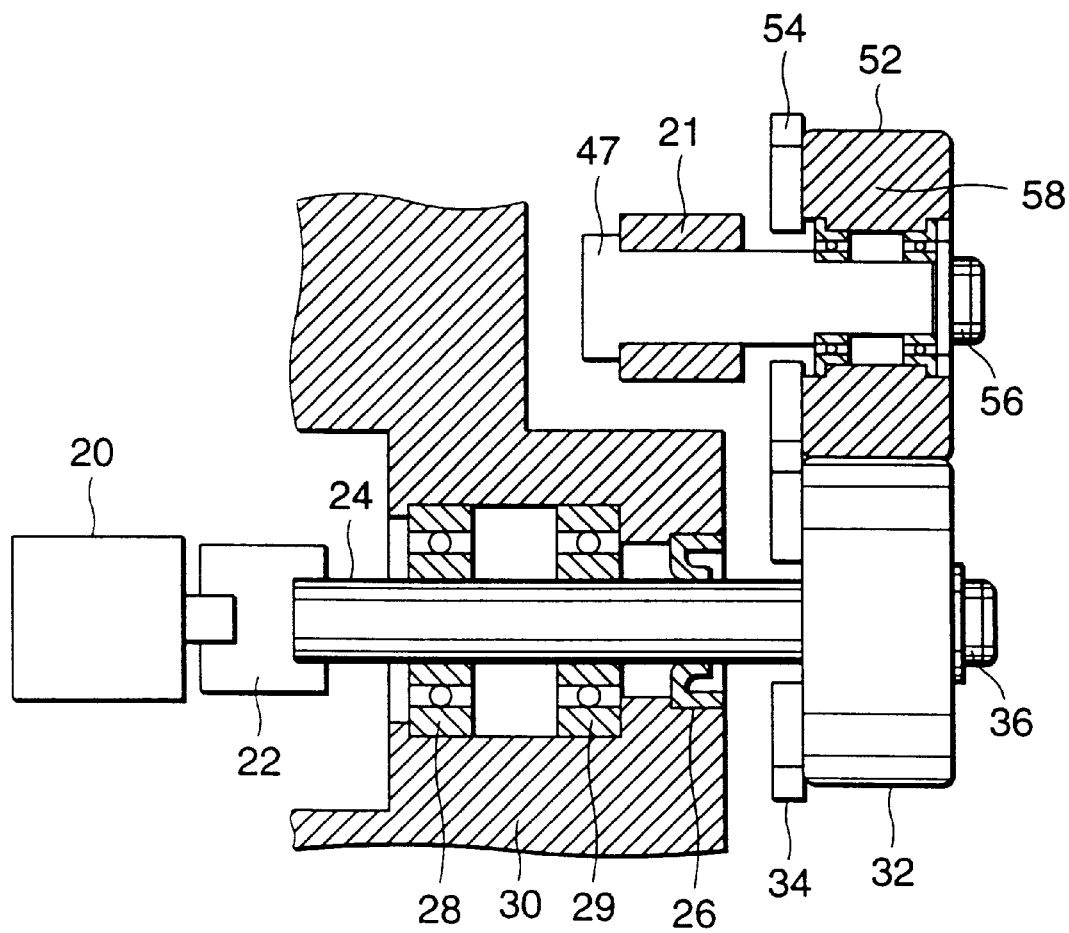
FIG. 5 is a cross-sectional view, taken in the direction of arrows along line V—V, of a conventional roller driving mechanism.
Figure 6:
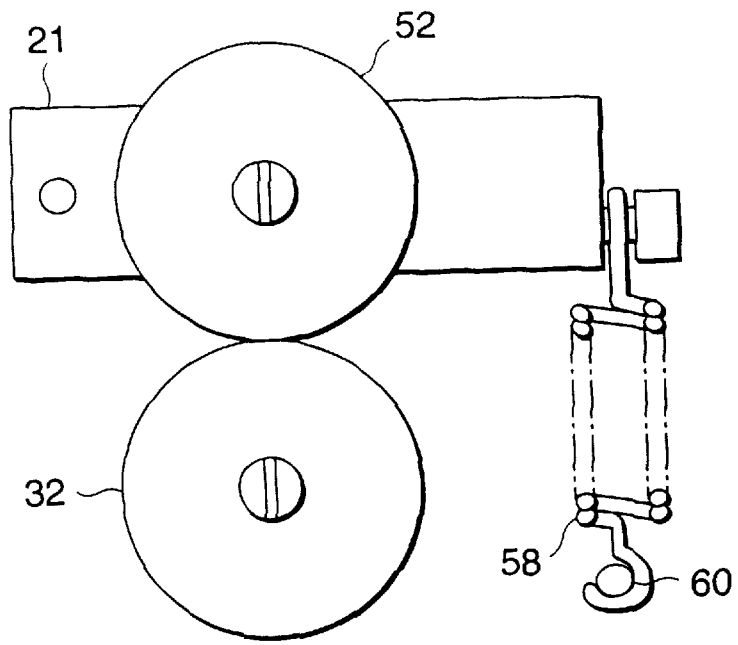
FIG. 6 is plan view of a conventional roller pressing mechanism.
Figure 7:
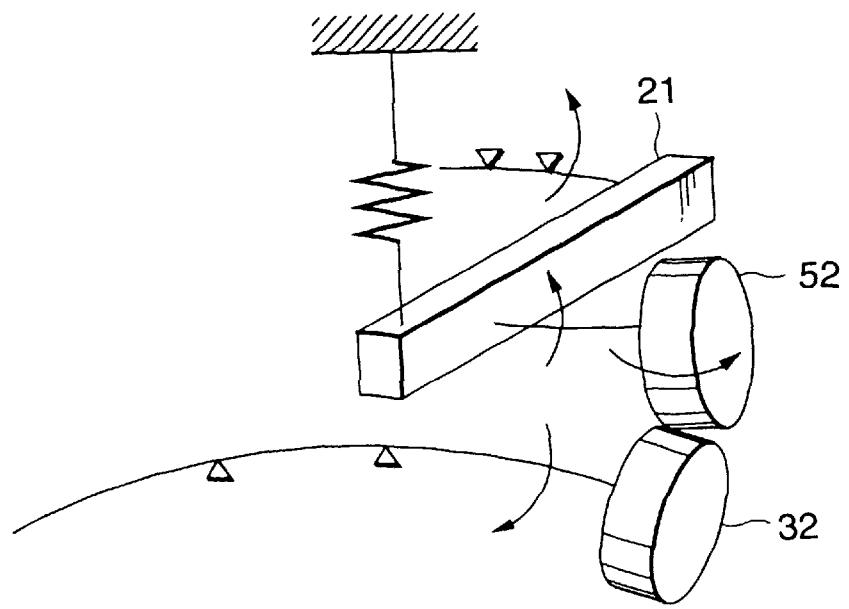
FIG. 7 is an explanatory diagram illustrating the state of operation of the rollers shown in FIG. 6.

Referring to FIGS. 1 and 4, a description will be given of an embodiment of the invention. FIG. 1 is a cross-sectional view of a roller driving mechanism according to an embodiment of the invention. In FIGS. 1 and 4, in terms of its main elements, the wire electrical discharge machine is comprised of a mechanism for feeding a wire electrode 1 and a mechanism for collecting it; a driving section for rotating a capstan roller 32 serving a first roller constituting this mechanism; a perpendicularly moving means for vertically moving a pinch roller 52 serving as a second roller in a perpendicular direction; a controlling means for controlling the amount of movement of the pinch roller 52 moved by this perpendicularly moving means; and a processing tank 9 placed on a surface plate 4 to keep the workpiece 2 immersed in a working fluid 7. Here, since the mechanism for feeding the wire electrode 1 and the mechanism for collecting it are substantially similar to those of the conventional art, a description thereof will be omitted.

In the driving section for the capstan roller 32, a shaft of a drive motor 20 is coupled to an end of a shaft 24 serving as a first shaft by means of a coupling 22, and a first gear 134 for meshing with a second gear 154 is secured to an end portion of this shaft 24.

The capstan roller 32 is fixed to an end of the shaft 24 by a bolt 36, and the shaft 24 is inserted and fixed in bearings 28 and 29 engaged and fixed in a groove portion in a housing 30. A seal 26 serving as a waterproofing means is provided in the housing 30 opposing an inner surface of the capstan roller 32.

The pinch roller 52 is fixed to one end of a shaft 124 serving as a second shaft by means of a bolt 56, and the shaft 124 is inserted and fixed in bearings 128 and 129, which are engaged and fixed in a groove portion in a housing 130, and is also loosely inserted in a hole provided in a perpendicular portion 130h of the housing 30. A seal 126 serving as a waterproofing means is provided in the housing 130 on the pinch roller 52 side thereof.

The perpendicularly moving means for the pinch roller 52 is arranged such that a rod of a cylinder 101 is fixed to a top surface of the housing 130, two guides 131 and 132 are fixed to a side surface of the housing 130, and a rail 162 slidingly engaged with the guides 131 and 132 is fixed to an inner surface of the perpendicular portion 130h of the housing 130. Consequently, as the rod of the cylinder 101 is extended or contracted, the pinch roller 52 is moved vertically together with the housing 130 so as to adjust the gap between the pinch roller 52 and the capstan roller 32, thereby making it possible to adjust the nipping force (pressing force) between the two rollers 32 and 52 in correspondence with the size of the wire electrode 1.

The controlling means 103 is formed by a known CPU, memory, and the like, and controls the amount of extension and contraction of the rod of the cylinder 101, whereby the guides 131 and 132 fixed to the housing 130 are moved in sliding engagement with the rail 162, thereby vertically moving the pinch roller 52 in the perpendicular direction. Specifically, as the pinch roller 52 is vertically moved by operating the cylinder 101, the gap between the two rollers 32 and 52 is made wider than the column formed by the liquid with the wire electrode 1 entrained therein, and the wire electrode 1, together with the liquid supplied from a pump 13, is inserted into the aforementioned gap, whereupon the pinch roller 52 is lowered to nip the wire electrode 1 by means of the capstan roller 32 and the pinch roller 52.

The operation of the wire electrical discharge machine constructed as described above will be described with reference to FIGS. 1 and 4. After the wire electrode 1 is inserted in advance in a start hole formed in the workpiece 2, the controlling means 103 drives the cylinder 101 to contract the rod of the cylinder 101, which in turn raises the pinch roller 52, providing a gap between the pinch roller 52 and the capstan roller 32. The wire electrode 1, together with the liquid flowing out from the pump 13 through the lower roller 12, is passed through a pipe 14, and the wire electrode 1 entrained in the liquid column is passed through the gap between the capstan roller 32 and the pinch roller 52. Here, the reason the wire electrode 1 is passed through the gap while forming the liquid column is that since the wire electrode 1 lacks rigidity, it is difficult for the wire electrode 1 alone to pass through the gap.

In such a state, the cylinder 101 is driven to extend the rod of the cylinder 101, and the housing 130 is lowered as the guides 131 and 132 secured to the housing 130 are being slid along the rail 162, thereby lowering the pinch roller 52 to nip the wire electrode 1 between the two rollers 32 and 52.

While the phenomenon of electric discharge is caused to take place between the wire electrode 1 and the workpiece 2, the workpiece 2 is subjected to cutting-out processing in wire electrical discharge machining, and the drive motor 20 is rotated, which in turn causes the first gear 134 fixed to the shaft 24 to rotate and the second gear 154 to rotate simultaneously. Consequently, the capstan roller 32 and the pinch roller 52 rotate while nipping the wire electrode 1, the wire electrode 1 is fed from a wire bobbin 10 through a pulley 11, and the used wire electrode 1 is accommodated in a collection box 60.

Second Embodiment

Figure 2:
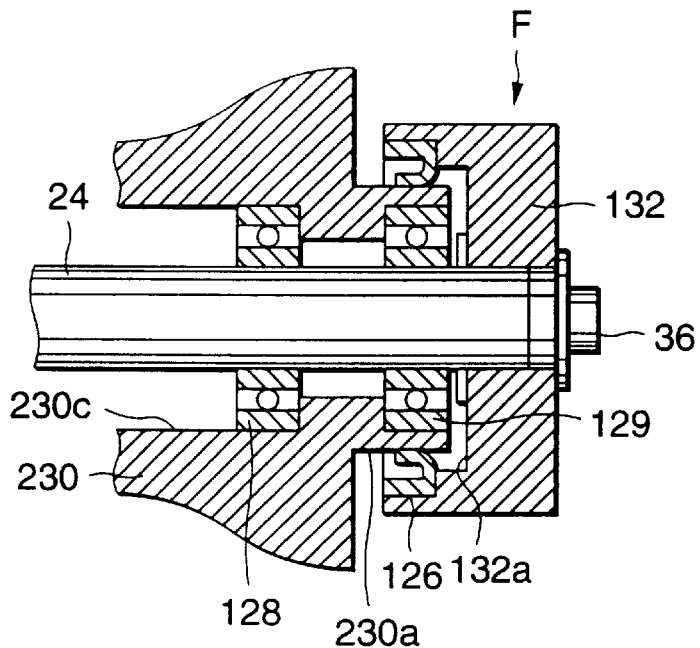
FIG. 2 is a cross-sectional view of a roller portion and its vicinity according to another embodiment of the invention.

Another embodiment of the invention will be described with reference to FIG. 2. FIG. 2 is a partially cross-sectional view illustrating the capstan roller and the bearing portion. In this embodiment, by making the distance between the capstan roller 132 and the bearing 129 as short as possible, the deformation of the shaft 24 is suppressed and the skew of the surface of the capstan roller 132 is suppressed. In FIG. 2, a hollow cylindrical projecting portion 230a is provided on a housing 230, and a hollow cylindrical groove 230c communicating with the projecting portion 230a is provided in the housing 230. The bearings 128 and 129 to which the shaft 24 are fixed are engaged and fixed in the groove 230c.

A hollow cylindrical recessed portion 132a, in which the projecting portion 230a of the housing 230 is loosely inserted, is provided in the capstan roller 132, and is fixed to one end of the shaft 24 by the bolt 36. A seal 126 is secured between an end of the recessed portion 132a of the capstan roller 132 and the projecting portion 230a of the housing 230.

According to the above-described arrangement, in a case where an unillustrated external force F is applied to the capstan roller 132, since the distance between the shaft 24 and the bearing 129 is short, the amount of deflection of the shaft 24 of the capstan roller 132 is reduced. Accordingly, the skew of the surface of the capstan roller 132 becomes unlikely to occur, so that the curling of the wire electrode 1 becomes difficult to occur.

Since the seal 126 is provided in such a manner as to cover the inner peripheral end of the recessed portion 132a of the capstan roller 132 and the outer peripheral end of the projecting portion 230a of the housing 230, the bearings 129 and 128 can be protected from the liquid. It should be noted that although a description has been given of the capstan roller 132, it is possible to adopt a similar arrangement for the pinch roller as well, and a similar advantage can be offered.

Third Embodiment

Figure 3:
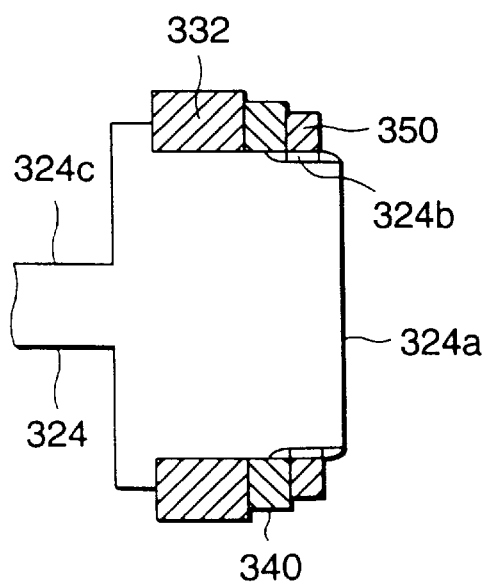
FIG. 3 is a cross-sectional view of the roller portion according to still another embodiment of the invention.

Referring to FIG. 3, a description will be given of still another embodiment of the invention. FIG. 3 is a cross-sectional view of the roller portion. In this embodiment, the position where the wire electrode 1 comes into contact with a capstan roller 332 is changed by a spacer 340 so as to prolong the life of the capstan roller 332.

In FIG. 3, a shaft 324 including a large-diameter portion 324a and a small-diameter portion 324c is provided. The capstan roller 332 of a hollow cylindrical shape and the spacer 340 of a similar shape but smaller than the capstan roller 332 are fitted over and fixed to the large-diameter portion 324a of the shaft 324. A nut 350 is threadedly engaged on a threaded portion 324b of the shaft 324.

In the above-described arrangement, when the surface of the capstan roller 332 becomes worn and its life expires, the nut 350 is removed from the threaded portion 324b of the shaft 324, and the spacer 340 and the capstan roller 332 are temporarily removed. Then, the same spacer 340 and capstan roller 332, in that order, are fitted over the large-diameter portion 324a of the shaft 324, and the nut 350 is threadedly engaged on the threaded portion 324b of the shaft 324.

According to the above-described arrangement, since two positions for nipping the wire electrode 1 can be provided on the surface portion of the same capstan roller 332, the life of the capstan roller 332 can be approximately doubled. In addition, if the number of spacers 340 is increased, the number of positions for nipping the wire electrode 1 on the surface of the capstan roller 332 can be increased in correspondence with the number of the spacers 340, so that the life of the capstan roller 332 can be further prolonged.

Further, since the shaft 324 is formed by the large-diameter portion 324a and the small-diameter portion 324c, and the capstan roller 332 is engaged on this large-diameter portion 324a, the material of the capstan roller 332 can be reduced. It should be noted that although a description has been given of the capstan roller 332, it is possible to adopt a similar arrangement for the pinch roller as well, and a similar advantage can be offered.

As described above, the wire electrical discharge machine according to the invention comprises: the wire electrode for causing electrical discharge to take place between the same and the workpiece; the first roller and the second roller for feeding the wire electrode while nipping the same; perpendicularly moving means for moving the second roller in a perpendicular direction with respect to the first roller; and liquid supplying means for guiding the wire electrode into a gap between the first roller and the second roller by means of the liquid. Accordingly, advantages are offered in that the wire electrode can be easily fed to the gap between the rollers, and that the wire electrode is difficult to curl.

What is claimed is:

1. A wire electrical discharge machine comprising:
   a wire electrode for causing electrical discharge to take place between the wire electrode and a workpiece;
   a first roller and a second roller for feeding the wire electrode while nipping the wire electrode;
   perpendicularly moving means for moving the second roller in a perpendicular direction with respect to the first roller;
   liquid supplying means for guiding the wire electrode into a gap between the first roller and the second roller by means of a liquid;
   a shaft coupled to the first roller or the second roller;
   a housing for incorporating the shaft;
   a recessed portion provided on a side surface of the first roller or the second roller coupled to the shaft; and
   a projecting portion provided on the housing so as to be loosely inserted in the recessed portion,
   wherein a bearing for engagement with the shaft is fixed to the projecting portion.

2. The wire electrical discharge machine of claim 1, wherein the perpendicularly moving means for moving the second roller in a perpendicular direction with respect to the first roller is arranged in such a way that a rod is fixed to a surface of said housing, whereby as the rod is extended or contracted, the second roller is moved so as to adjust the gap between the second roller and first roller.

3. A wire electrical discharge machine comprising:
   a wire electrode for causing electrical discharge to take place between the wire electrode and a workpiece;
   a first roller and a second roller for feeding the wire electrode while nipping the wire electrode;
   perpendicularly moving means for moving the second roller in a perpendicular direction with respect to the first roller;
   liquid supplying means for guiding the wire electrode into a gap between the first roller and the second roller by means of a liquid;
   a first shaft and a second shaft whose one ends are respectively coupled to the first roller and the second roller;
   a housing for incorporating the first shaft and the second shaft;
   a first gear coupled to another end portion of the first shaft; and
   a second gear coupled to another end portion of the second shaft and meshing with the first gear.

4. A wire electrical discharge machine comprising:
   a wire electrode for causing electrical discharge to take place between the wire electrode and a workpiece;
   a first roller and a second roller for feeding the wire electrode while nipping the wire electrode;
   perpendicularly moving means for moving the second roller in a perpendicular direction with respect to the first roller;
   liquid supplying means for guiding the wire electrode into a gap between the first roller and the second roller by means of a liquid;
   a shaft which is detachably fitted in the first roller or the second roller; and
   a spacer provided on a side surface of the first roller or the second roller, the spacer being detachably fitted on the shaft.

* * * * *